United States Patent
Odaka

(10) Patent No.: US 8,441,555 B2
(45) Date of Patent: *May 14, 2013

(54) IMAGE CAPTURING APPARATUS WITH ELECTRONIC ZOOM AND RECORDING SIZE SETTING, AND CONTROL METHOD AND PROGRAM THEREFOR

(75) Inventor: Yukio Odaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,339

(22) Filed: Mar. 29, 2012

(65) Prior Publication Data

US 2012/0182449 A1 Jul. 19, 2012

Related U.S. Application Data

(63) Continuation of application No. 12/651,925, filed on Jan. 4, 2010.

(30) Foreign Application Priority Data

Jan. 9, 2009 (JP) .................................. 2009-003997
Dec. 22, 2009 (JP) .................................. 2009-291413

(51) Int. Cl.
*H04N 5/262* (2006.01)
*H04N 5/76* (2006.01)

(52) U.S. Cl.
USPC .................................. 348/240.2; 348/231.99

(58) Field of Classification Search ............. 348/240.99, 348/240.2, 231.99, 231.2
See application file for complete search history.

(56) References Cited

U.S. PATENT DOCUMENTS

| | | | |
|---|---|---|---|
| 6,798,447 B1 * | 9/2004 | Katsuki | 348/208.12 |
| 6,943,835 B2 * | 9/2005 | Okubo | 348/240.2 |
| 7,046,290 B2 * | 5/2006 | Nozaki | 348/350 |
| 7,420,598 B1 * | 9/2008 | Ito | 348/240.2 |
| 7,505,633 B2 * | 3/2009 | Kitajima | 382/276 |
| 7,672,569 B2 * | 3/2010 | Horiuchi et al. | 386/223 |
| 7,880,792 B2 * | 2/2011 | Yanagi | 348/333.01 |
| 2006/0176389 A1 * | 8/2006 | Kaneda | 348/335 |
| 2009/0167897 A1 * | 7/2009 | Fujita | 348/240.1 |
| 2009/0268079 A1 * | 10/2009 | Motomura et al. | 348/347 |
| 2010/0053365 A1 * | 3/2010 | Abe et al. | 348/222.1 |

* cited by examiner

*Primary Examiner* — Kelly L Jerabek
(74) *Attorney, Agent, or Firm* — Cowan, Liebowitz & Latman, P.C.

(57) ABSTRACT

An image recording apparatus for recording an image captured by use of electronic zoom, comprises an electronic-zoom setting unit configured to set a zoom magnification when using the electronic zoom, a recording-mode selection unit configured to select at least either a non-compression format or a compression format as a recording mode in recording the captured image, a recording-size setting unit configured to set a recording size in each recording mode, and a control unit configured to, when the zoom magnification is set to a magnification at which an image is enlarged, control a recording size in the non-compression format to be larger than the recording size set by the recording-size setting unit.

20 Claims, 15 Drawing Sheets

FIG. 8A

| RECORDING MODE | RAW+JPEG |
|---|---|
| JPEG-IMAGE RECORDING SIZE | L |
| RAW-IMAGE RECORDING SIZE | RAW |
| ELECTRONIC ZOOM | OFF |

FIG. 8B

| RECORDING MODE | RAW+JPEG |
|---|---|
| JPEG-IMAGE RECORDING SIZE | L |
| RAW-IMAGE RECORDING SIZE | RAW |
| ELECTRONIC ZOOM | OFF |

FIG. 8C

| RECORDING MODE | RAW+JPEG |
|---|---|
| JPEG-IMAGE RECORDING SIZE | L |
| RAW-IMAGE RECORDING SIZE | RAW |
| ELECTRONIC ZOOM | OFF |

FIG. 8D

| RECORDING MODE | RAW+JPEG |
|---|---|
| JPEG-IMAGE RECORDING SIZE | L |
| RAW-IMAGE RECORDING SIZE | RAW |
| ELECTRONIC ZOOM | OFF |

FIG. 13
| RAW-IMAGE RECORDING SIZE | NUMBER OF RECORDED MEGA PIXELS (APPROXIMATELY) | HORIZONTAL×VERTICAL |
|---|---|---|
| RAW | 24 | 6000×4000 |
| RAW-M1 | 12 | 4243×2828 |
| RAW-M2 | 6 | 3000×2000 |
| RAW-S1 | 3 | 2121×1414 |
| RAW-S2 | 15 | 1500×1000 |
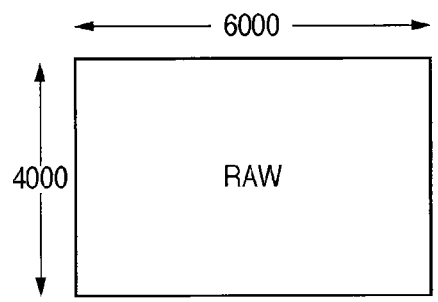
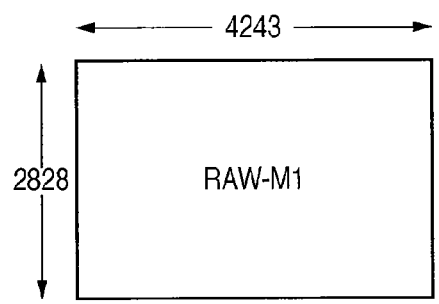
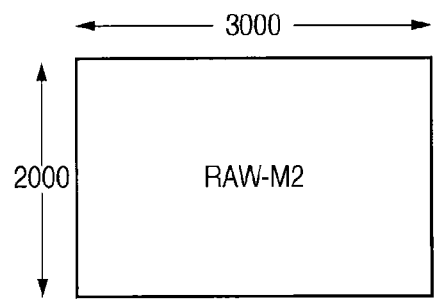
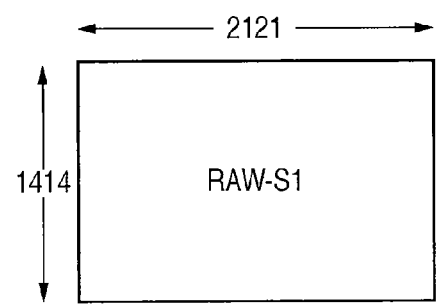
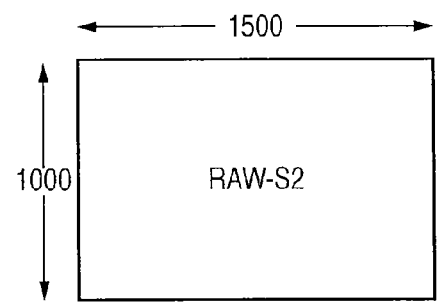

FIG. 14A

| JPEG-IMAGE RECORDING SIZE | L |
| --- | --- |
| | M1 |
| | M2 |
| | S1 |
| | S2 |

(L highlighted)

FIG. 14B

| JPEG-IMAGE RECORDING SIZE | L |
| --- | --- |
| | M1 |
| | M2 |
| | S1 |
| | S2 |

(M1 highlighted)

FIG. 14C

| JPEG-IMAGE RECORDING SIZE | L |
| --- | --- |
| | M1 |
| | M2 |
| | S1 |
| | S2 |

(M2 highlighted)

FIG. 14D

| JPEG-IMAGE RECORDING SIZE | L |
| --- | --- |
| | M1 |
| | M2 |
| | S1 |
| | S2 |

(S1 highlighted)

FIG. 14E

| JPEG-IMAGE RECORDING SIZE | L |
| --- | --- |
| | M1 |
| | M2 |
| | S1 |
| | S2 |

(S2 highlighted)

FIG. 15
| JPEG-IMAGE RECORDING SIZE | NUMBER OF RECORDED MEGA PIXELS (APPROXIMATELY) | HORIZONTAL×VERTICAL |
|---|---|---|
| L | 24 | 6000×4000 |
| M1 | 12 | 4243×2828 |
| M2 | 6 | 3000×2000 |
| S1 | 3 | 2121×1414 |
| S2 | 15 | 1500×1000 |
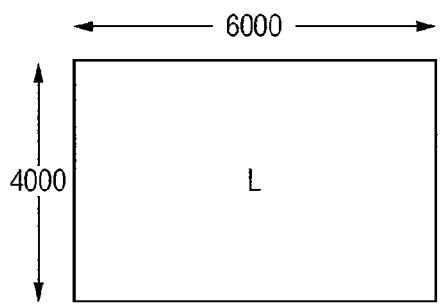
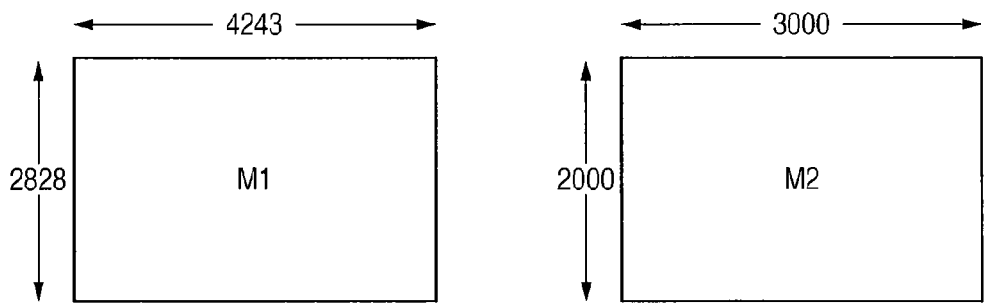
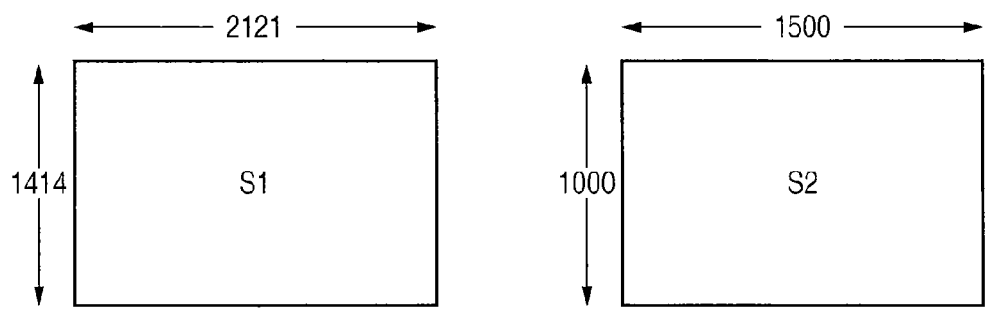

IMAGE CAPTURING APPARATUS WITH ELECTRONIC ZOOM AND RECORDING SIZE SETTING, AND CONTROL METHOD AND PROGRAM THEREFOR

CROSS-REFERENCE TO RELATED APPLICATION

This application is a continuation of application Ser. No. 12/651,925, filed Jan. 4, 2010, the entire disclosure of which is hereby incorporated by reference.

BACKGROUND OF THE INVENTION

1. Field of the Invention

The present invention relates to an image recording technology for recording an image that has been captured by the use of electronic zoom.

2. Description of the Related Art

Digital cameras are designed to capture an object image with an image-sensing element and to record image data output from the image-sensing element to a recording medium.

In recording captured image data on a recording medium, some digital camera models allow selection of a recording format from the following two options:

(1) Irreversibly compressed data in, for example, JPEG format (compression format) that has gone through ordinary image processing; and (2) Raw data that has been output from an image-sensing element (i.e., in RAW format (non-compression format)).

Of these digital cameras, some models are also capable of recording data in both JPEG and RAW formats through a single image capture operation.

There are also some models that are capable of selecting the recording size of a JPEG image or the recording size of a RAW image from multiple choices of options.

Moreover, many cameras have electronic zoom functionality to electronically enlarge an image by narrowing down an original range of data read by an image-sensing element.

If an image within such a readout range has a higher resolution than an image in the selected recording format, degradation in image quality becomes small; however, as resolutions within such a readout range become lower than those in the recording format, a zoom magnification increases and degradation in image quality thereby increases.

Japanese Patent Laid-Open No. 2001-061091 describes a technique in which the recording size of an image captured by the use of electronic zoom is kept somewhat constant. Japanese Patent Laid-Open No. 2002-077715 describes a technique in which, if the recording mode is set to a low compression rate or a non-compression format, the settings of the electronic zoom function are regulated.

In the case of enlarging an image captured by the use of electronic zoom, if the recording size of a RAW image is smaller than that of a JPEG image, a JPEG image that is generated by developing a RAW image recorded at the time of image capture suffers more severe degradation in image quality than a JPEG image recorded at the time of image capture.

SUMMARY OF THE INVENTION

The present invention has been made in view of the aforementioned problems and provides an image recording technology for, in the case of enlarging an image captured by the use of electronic zoom, reducing degradation in the quality of a JPEG image that is generated from a RAW image recorded at the time of image capture.

In order to solve the aforementioned problems, the present invention provides an image recording apparatus for recording an image captured by use of electronic zoom, comprising: an electronic-zoom setting unit configured to set a zoom magnification when using the electronic zoom; a recording-mode selection unit configured to select at least either a non-compression format or a compression format as a recording mode in recording the captured image; a recording-size setting unit configured to set a recording size in each recording mode; and a control unit configured to, when the zoom magnification is set to a magnification at which an image is enlarged, control a recording size in the non-compression format to be larger than the recording size set by the recording-size setting unit.

The present invention also provides a method for controlling an image recording apparatus that records an image captured by use of electronic zoom, comprising: an electronic-zoom setting step of setting a zoom magnification when using the electronic zoom; a recording-mode selection step of selecting at least either a non-compression format or a compression format as a recording mode in recording the captured image; a recording-size setting step of setting a recording size in each recording mode; and a control step of, when the zoom magnification is set to a magnification at which an image is enlarged, controlling a recording size in the non-compression format to be larger than the recording size set by the recording-size setting step.

According to the present invention, in the case of enlarging and capturing an image using the electronic zoom function, it is possible to reduce degradation in the quality of a JPEG image that is generated from a RAW image recorded at the time of image capture.

Further features of the present invention will become apparent from the following description of exemplary embodiments (with reference to the attached drawings).

BRIEF DESCRIPTION OF THE DRAWINGS

FIGS. 8A to 8D are diagrams explaining a menu process according to an embodiment of the present invention.

FIG. 13 is a diagram explaining the details of a RAW-image recording size according to an embodiment of the present invention.

FIGS. 14A to 14E are diagrams explaining a JPEG-image recording-size setting process according to an embodiment of the present invention.

FIG. 15 is a diagram explaining the details of a JPEG-image recording size according to an embodiment of the present invention.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

First Embodiment

Figure 1:
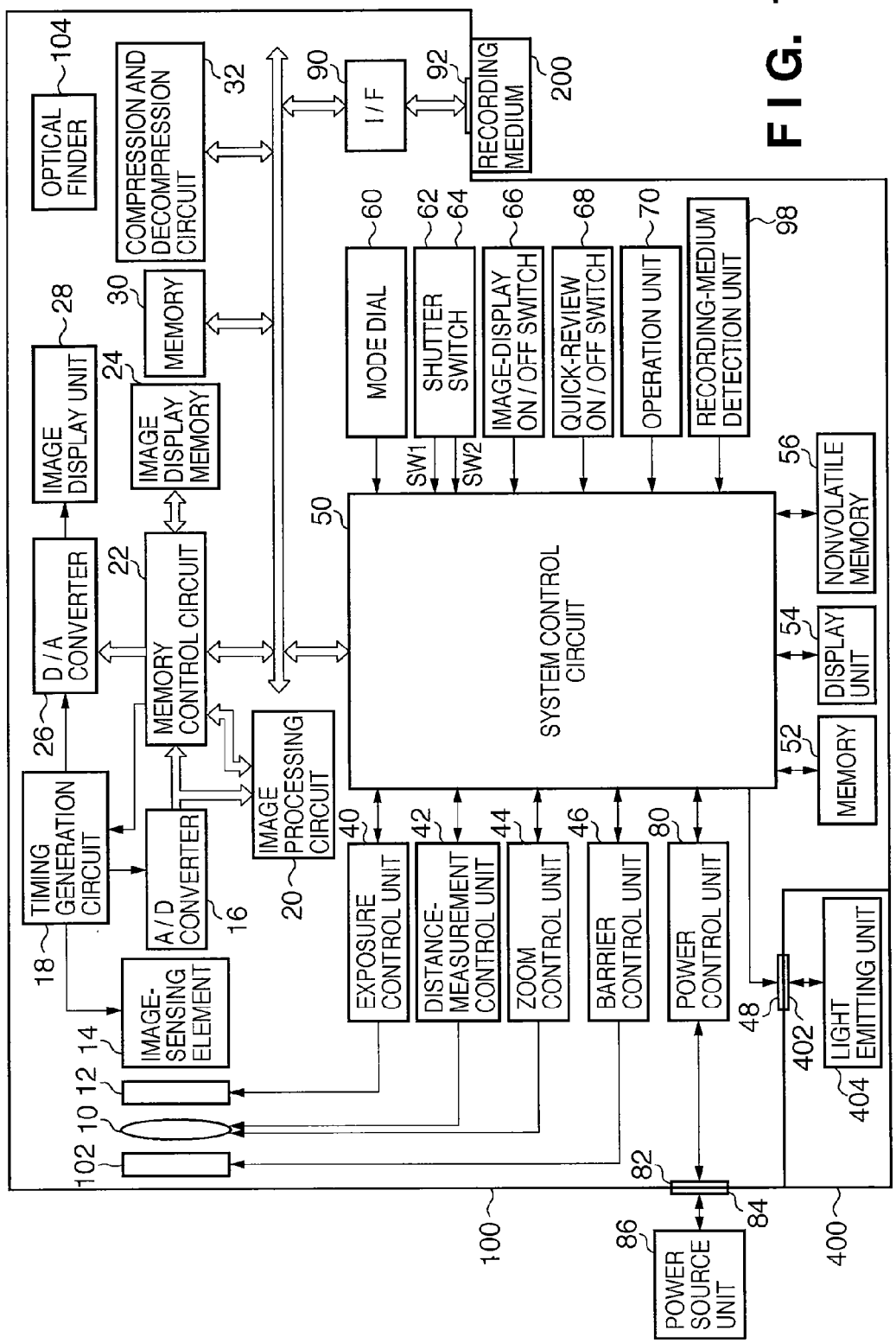
FIG. 1 is a block diagram of an image recording apparatus according to a first embodiment of the present invention.

FIG. 1 is a block diagram illustrating a configuration of an image recording apparatus according to a first embodiment of the present invention.

An image recording apparatus 100 according to the present embodiment has the function of an electronic camera.

Reference numeral 10 denotes an image sensing lens. Reference numeral 12 denotes a shutter provided with aperture functionality. Reference numeral 14 denotes an image-sensing element that converts an optical image into an electrical signal. Reference numeral 16 denotes an A/D converter that converts an analog signal output from the image-sensing element 14 into a digital signal.

Reference numeral 18 denotes a timing generation circuit that supplies clock signals and control signals to the image-sensing element 14, the A/D converter 16, and a D/A converter 26, under the control of a memory control circuit 22 and a system control circuit 50.

Reference numeral 20 denotes an image processing circuit that performs predetermined processing, such as pixel interpolation and color conversion, on data from the A/D converter 16 or on data from the memory control circuit 22. The image processing circuit 20 also performs predetermined computations using captured image data and supplies the computation results to the system control circuit 50.

The system control circuit 50 controls an exposure control unit 40 and a distance-measurement control unit 42, based on the obtained computation results, so as to implement a TTL (through-the-lens) AF (autofocus) process, an AE (auto-exposure) process, and an EF (flash pre-emission) process. The image processing circuit 20 also performs a TTL AWB (auto white balance) process using the captured image data.

Reference numeral 22 denotes a memory control circuit that controls the A/D converter 16, the timing generation circuit 18, the image processing circuit 20, the image display memory 24, the D/A converter 26, a memory 30, and a compression and decompression circuit 32.

The data output from the A/D converter 16 is supplied to the memory control circuit 22 either directly or via the image processing circuit 20, and is written to the image display memory 24 or to the memory 30.

Reference numeral 24 denotes an image display memory. Reference numeral 26 denotes a D/A converter. Reference numeral 28 denotes an image display unit that is configured of a TFT-LCD or the like. The image data written to the image display memory 24 for display is supplied to the image display unit 28 via the D/A converter 26, whereby an image is displayed on the image display unit 28. An electronic viewfinder function can be implemented by sequentially displaying captured images using the image display unit 28. The image display unit 28 can also be used to implement a reproduction display function and a variety of other display functions.

In addition, the display on the image display unit 28 can arbitrarily be turned on and off under instructions from the system control circuit 50; turning off the display on the image display unit 28 makes a considerable reduction in the power consumed by the image recording apparatus 100.

Reference numeral 30 denotes a memory that stores captured still images and moving images. The memory 30 is provided with a storage capacity sufficient for storing a predetermined number of still images and a predetermined time's worth of moving images. With the use of this memory 30, it is possible to quickly write large numbers of images even in those cases such as during continuous exposures in which multiple still images are captured in sequence, during panoramic exposures, and so on. It is also possible to use the memory 30 as a work area for the system control circuit 50.

Reference numeral 32 denotes a compression and decompression circuit that compresses and decompresses image data using an ADCT (adaptive-discrete-cosine transform) or the like. The compression and decompression circuit 32 reads images stored in the memory 30, performs a compression or decompression process thereon, and then writes the processed data back into the memory 30.

Reference numeral 40 denotes an exposure control unit that controls the shutter 12 having aperture functionality, and also implements flash dimmer functionality through cooperation with a flash device 400.

Reference numeral 42 denotes a distance-measurement control unit that controls the focusing of the image-sensing lens 10. The system control circuit 50 controls the exposure control unit 40 and the distance-measurement control unit 42 based on the results of computations performed by the image processing circuit 20 on the captured image data. In this manner, exposure control and distance-measurement control are provided using the TTL system.

Reference numeral 44 denotes a zoom control unit that controls a zoom of the image-sensing lens 10. Reference numeral 46 denotes a barrier control unit that controls the operation of a barrier (protection unit) 102. Reference numeral 48 denotes a connector that is also referred to as an accessory shoe. The connector 48 includes electrical contacts for the flash device 40 and devices for mechanically fixing the flash device 40.

Reference numeral 50 denotes a system control circuit that controls the entire image recording apparatus 100. Reference numeral 52 denotes a memory that stores constants, variables, programs, and so on, for use in the operation of the system control circuit 50.

Reference numeral 54 denotes a display unit, such as a liquid crystal display or a speaker, that presents operating states, messages, and the like through characters, images, audio, and the like, in accordance with the execution of a program by the system control circuit 50. The display unit 54 is configured of a combination of an LCD, an LED, a speaker, and the like, and is provided in single location or multiple locations so as to be easily recognizable near the operation unit of the image recording apparatus 100. Some of the functions of the display unit 54 are provided in an optical viewfinder 104.

The following are examples of the details displayed by the display unit 54 in an LCD or the like: a single shot/continuous exposure display; a self-timer display; a compression-rate display; a display showing the number of recorded pixels; a display showing the number of recorded images; a display showing the remaining number of images that can be captured; a shutter-speed display; and an aperture display. Furthermore, an exposure correction display, a flash display, a red-eye reduction display, a macro image capture display, a buzzer setting display, a display showing the remaining battery life for a clock, a display showing the remaining battery life, an error display, a multi-digit number information display, a display showing whether a recording medium 200 has been mounted or not, a display showing the operation of a communication I/F, and a date and time display may be included.

Meanwhile, the following can be given as examples of the details displayed by the display unit 54 in the optical viewfinder 104: a focus display; an image-stabilization alarm display; a flash charge display; a shutter-speed display; an aperture display; and an exposure correction display.

Reference numeral 56 denotes a nonvolatile memory, such as an EEPROM or the like, on which data can be recorded and deleted electrically.

Reference numerals 60, 62, 64, 66, 68, and 70 denote operation devices, by which the user inputs various operational instructions into the system control circuit 50; they are each configured of one or a combination of switches, dials, a touch panel, a pointing device that uses vision detection, a voice recognition device, or the like.

More specifically, reference numeral 60 denotes a mode dial switch that switches between functional modes, such as power off; an automatic exposure mode including a program AE mode; a full-automatic exposure mode; a manual exposure mode; and so on.

Reference numeral 62 denotes a shutter switch SW1 that is turned on when a shutter button (not shown) is pressed partway, in order to give instructions to start operations such as an AF (autofocus) process, an AE (auto-exposure) process, an AWB (auto white balance) process, and an EF (flash pre-emission) process.

Reference numeral 64 denotes a shutter switch SW2 that is turned on when the above shutter button is pressed fully; turning-on of the shutter switch SW2 indicates the start of an exposure process in which a signal read from the image-sensing element 14 is written as image data into the memory 30 via the A/D converter 16 and the memory control circuit 22. The turning-on of the shutter switch SW2 also indicates the start of a series of operations that include development processing using computations performed by the image processing circuit 20 and the memory control circuit 22; and recording processing in which image data is read from the memory 30, compressed by the compression and decompression circuit 32, and written into the recording medium 200.

Reference numeral 66 denotes an image-display ON-OFF switch that turns the image display unit 28 on and off. This function blocks power supply to the image display unit configured of a TFT-LCD or the like, at the time of image capture with the optical viewfinder 104, thereby reducing power consumption.

Reference numeral 68 denotes a quick-review ON/OFF switch that turns quick review functionality on and off to automatically reproduce the captured image data immediately after image capture.

Reference numeral 70 denotes an operation unit that is made up of various buttons, a touch panel, and so on. The operation unit 70 includes, for example, a menu button; a set button; a macro button; a single exposure/continuous exposure/self timer switch button; a menu shift + (plus) button; a menu shift − (minus) button, an image-quality selection button, an exposure correction button, and a date and time set button.

Reference numeral 80 denotes a power control unit that is configured of a battery detection circuit, a DC-DC converter, switch circuits for switching the blocks through which power passes, and so on. The power control unit 80 detects the presence or absence of battery installation, the type of battery, and the remaining battery life, controls the DC-DC converter based on the detection results and instructions from the system control circuit 50, and supplies the necessary voltage for the necessary period to the various units, including the recording medium.

Reference numerals 82 and 84 denote connectors. Reference numeral 86 denotes a power source unit that is configured of, for example, primary batteries such as alkaline batteries and lithium batteries; secondary batteries such as BNiCd batteries, NiMH batteries, and Li batteries; an AC adapter; and so on.

Reference numeral 90 denotes an interface that makes connections to the recording medium 200. Reference numeral 92 denotes a connector that makes connections to the recording medium 200.

Reference numeral 98 denotes a recording-medium detection unit that detects whether or not the recording medium 200 has been mounted onto the connector 92.

Reference numeral 102 denotes a barrier (protection unit) that prevents an imaging unit, including the image-sensing lens 10 of the image recording apparatus 100, from being soiled or damaged by covering that imaging unit.

Reference numeral 104 denotes an optical viewfinder. With the use of the optical viewfinder 104, it is possible to capture an image without using the electronic viewfinder functionality of the image display unit 28. The optical viewfinder 104 is also provided with devices for implementing some of the functions of the display unit 54, such as, for example, a focus display, an image-stabilization alarm display, a flash charge display, a shutter-speed display, an aperture display, and an exposure correction display.

Reference numeral 200 denotes a removable recording medium such as a CF (Compact Flash®) card.

Reference numeral 400 denotes a flash device. Reference numeral 402 denotes a connector that connects the flash device 400 to the accessory shoe 48 of the image recording apparatus 100. Reference numeral 404 denotes a light emitting unit provided with AF-auxiliary-light projector functionality and flash-light control functionality.

The operations of the image recording apparatus according to the present embodiment are described next with reference to FIGS. 2 through 15.

Figure 2:
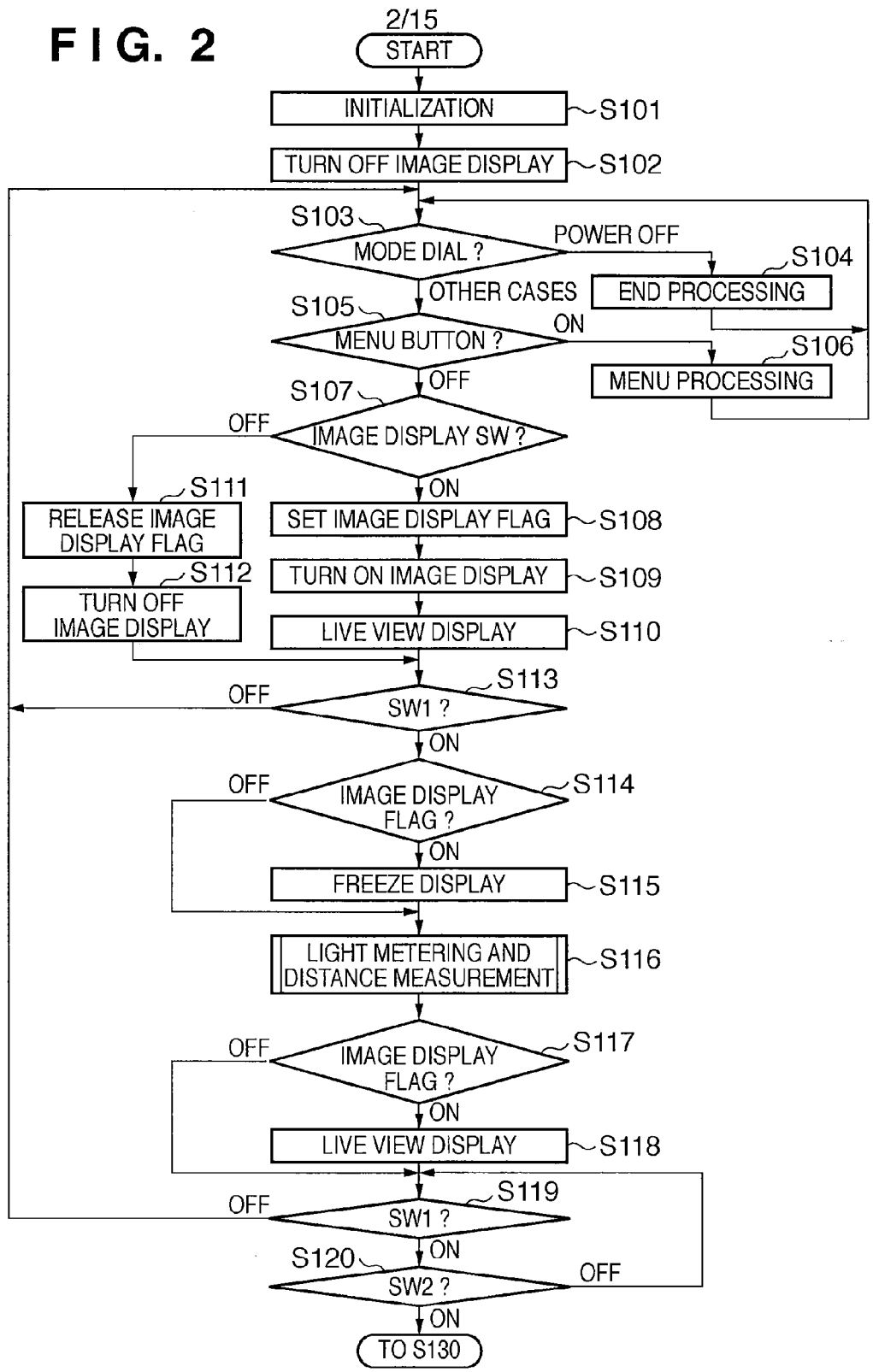
FIG. 2 is a flow chart of a main routine performed by an image recording apparatus according to an embodiment of the present invention.
Figure 3:
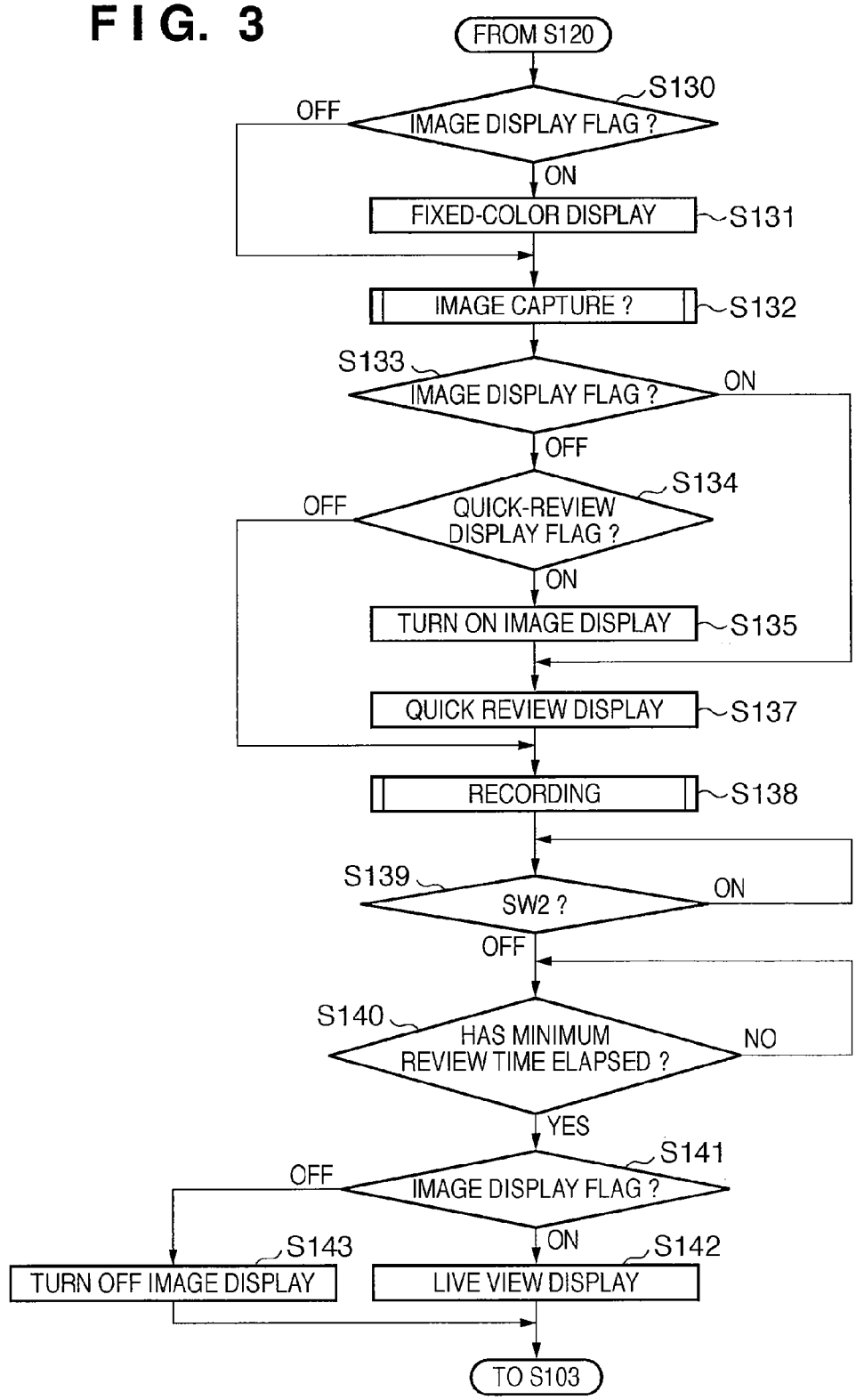
FIG. 3 is a flow chart of the main routine performed by an image recording apparatus according to an embodiment of the present invention.

FIGS. 2 and 3 are flow charts illustrating a main routine of the image recording apparatus 100 according to the present embodiment.

Referring to FIG. 2, when power is turned on by replacing a battery or the like, the system control circuit 50 initializes flags, control variables, and the like in S101.

In S101, initialization is performed; specifically, electronic zoom is turned off; recording mode is set to JPEG image; the recording size of a JPEG image is set to L (large); and the recording size of a RAW image is set to RAW (raw).

In S102, the system control circuit 50 initializes the display state of the image display unit 28 to an OFF state.

In S103, the system control circuit 50 confirms the setting of the mode dial 60; if the mode dial 60 is in its "OFF" state, processing proceeds to S104, and if the mode dial 60 is not in the "OFF" state, processing proceeds to S105.

In S104, the system control circuit 50 changes the display states of the display units 28 and 54 to an end state and closes the barrier (protection unit) 102 to protect the image capture unit. Moreover, in S104, required parameters and set values including flags, control variables, and the like, together with set modes, are recorded in the nonvolatile memory 56; the power control unit 80 performs predetermined end processing such as blocking unnecessary power supply to the units of the image recording apparatus 100 including the image display unit 28; and then, processing returns to S103.

In S105, the system control circuit 50 confirms the state of a menu button of the operation unit; if the menu button of the operation unit 70 is pressed, processing proceeds to S106; and if the menu button of the operation unit 70 is not pressed, processing proceeds to S107.

In S106, the system control circuit 50 performs a menu setting process.

The details of the menu setting process (S106) will be described later with reference to FIGS. 8A to 8D.

In this step, an operation to change menu items is performed, and after the completion of the step, processing returns to S103.

In S107, the system control circuit 50 confirms the setting of the image-display ON/OFF switch 66; if the image display is ON, processing proceeds to S108; and if the image display is OFF, processing proceeds to S111.

In S108, the system control circuit 50 sets an image display flag.

In S109, the system control circuit 50 sets the display state of the image display unit 28 to the ON state.

In S110, the system control circuit 50 sets a live-view display state in which captured image data is sequentially displayed. In the live-view display state, data that is sequentially written to the image display memory 24 via the image-sensing element 14, the A/D converter 16, the image processing circuit 20, and the memory control circuit 22 is sequentially displayed by the image display unit 28 via the memory control circuit 22 and the D/A converter 26. The electronic viewfinder function is thereby implemented.

In S111, the system control circuit 50 resets the image display flag.

In S112, the system control circuit 50 sets the display state of the image display unit 28 to the OFF state. If the image display is OFF, image capture with the optical viewfinder 104 is performed without using the electronic viewfinder function of the image display unit 28. This reduces power consumption by the image display unit 28, the D/A converter 26, and the like that consume large amounts of power. Note that the status of the image display flag is stored in the internal memory of the system control circuit 50 or in the memory 52.

In S113, the system control circuit 50 confirms the state of the shutter switch SW1, and if the shutter switch SW1 is OFF, processing returns to S103. If the shutter switch SW1 is ON, on the other hand, processing proceeds to S114.

In S114, the system control circuit 50 confirms the status of the image display flag; if the image display flag has been set, processing proceeds to S115; and if the image display flag has been reset, processing proceeds to S116.

In S115, the system control circuit 50 sets the display state of the image display unit 28 to a freeze display state. In the freeze display state, rewriting of image data in the image display memory 24 via the image-sensing element 14, the A/D converter 16, the image processing circuit 20, and the memory control circuit 22 is prohibited. A freeze-frame image is then displayed in the electronic viewfinder by displaying the last piece of image data that has been written on the image display unit 28 via the memory control circuit 22 and the D/A converter 26.

In S116, the system controller 50 performs distance-measuring processing to align the focal point of the image sensing lens 10 on the object, and light-metering processing to set an aperture and a shutter speed. If necessary, the settings of the flash are also set during the light metering. The details of such distance-measuring and light-metering processing (S116) will be described later with reference to FIG. 4.

In S117, the system control circuit 50 confirms the status of the image display flag; if the image display flag has been set, processing proceeds to S118; and if the image display flag has been reset, processing proceeds to S119.

In S118, the system control circuit 50 sets the display state of the image display unit 28 to a live-view display state in which captured image data is sequentially displayed. Note that live view display in this step is the same operating state as live view display in S110.

In S119, the system control circuit 50 confirms the state of the shutter switch SW1, and if the shutter switch SW1 is OFF, processing returns to S103. If the shutter switch SW1 is ON, then the system control circuit 50 further confirms the state of the shutter switch SW2 in S120; if the shutter switch SW2 is OFF, processing returns to S119; and if the shutter switch SW2 is ON, processing proceeds to S130.

In S130, the system control circuit 50 confirms the status of the image display flag; if the image display flag has been set, processing proceeds to S131; and if the image display flag has been released reset, processing proceeds to S132.

In S131, the system control circuit 50 sets the display state of the image display unit 28 to a fixed-color display state. In the fixed-color display state, captured image data that has been written to the image display memory 24 via the image-sensing element 14, the A/D converter 16, the image processing circuit 20 and the memory control circuit 22 is replaced by fixed-color image data, and then, the replaced fixed-color image data is displayed on the image display unit 28. A fixed-color image is thereby displayed in the electronic viewfinder.

In S132, the system control circuit 50 performs image capture processing composed of exposure processing and development processing. In the exposure processing, image data is written to the memory 30 via the image-sensing element 14, the A/D converter 16, the image processing circuit 20, and the memory control circuit 22, or via the A/D converter 16 directly to the memory control circuit 22. In the development processing, various processing is performed on image data that has been written to or read from the memory 30, using the memory control circuit 22 and, if necessary, using the image processing circuit 20. The details of the image capture processing (S132) will be described later with reference to FIG. 5.

In S133, the system control circuit 50 confirms the status of the image display flag; if the image display flag has been set, processing proceeds to S136; and if the image display flag has been reset, processing proceeds to S134.

In S134, the system control circuit 50 confirms the status of a quick-review display flag; if the quick-review display flag has been set, processing proceeds to S135; and if the quick-review display flag has been reset, processing proceeds to S137.

In S135, the system control circuit 50 sets the display state of the image display unit 28 to an "ON" state.

In S136, the system control circuit 50 sets the display state of the image display unit 28 to a quick-review display state.

In S137, the system control circuit 50 reads captured image data from the memory 30, and various image processes are performed using the memory control circuit 22 and, if necessary, the image processing circuit 20. The system control circuit 50 also performs a recording process (S137) in which image compression processing is firstly performed depending on the set mode using the compression and decompression circuit 32, and then, the resultant image data is written to the recording medium 200.

The details of the recording process (S137) will be described later with reference to FIG. 6.

In S138, the system control circuit 50 confirms the state of the shutter switch SW2 and is left on standby until the shutter switch SW2 is turned off.

In S139, the system control circuit 50 is left on standby until a prescribed minimum review time has elapsed.

In S140, the system control circuit 50 confirms the status of the image display flag; if the image display flag has been set, processing proceeds to S141 and if the image display flag has been reset, processing proceeds to S142.

In S141, the system control circuit 50 sets the display state of the image display unit 28 to a live-view display state in which captured image data is sequentially displayed. Note that live-view display in this step is the same operating state as live-view display in S110.

In S142, the system control circuit 50 sets the display state of the image display unit 28 to the OFF state.

Figure 4:
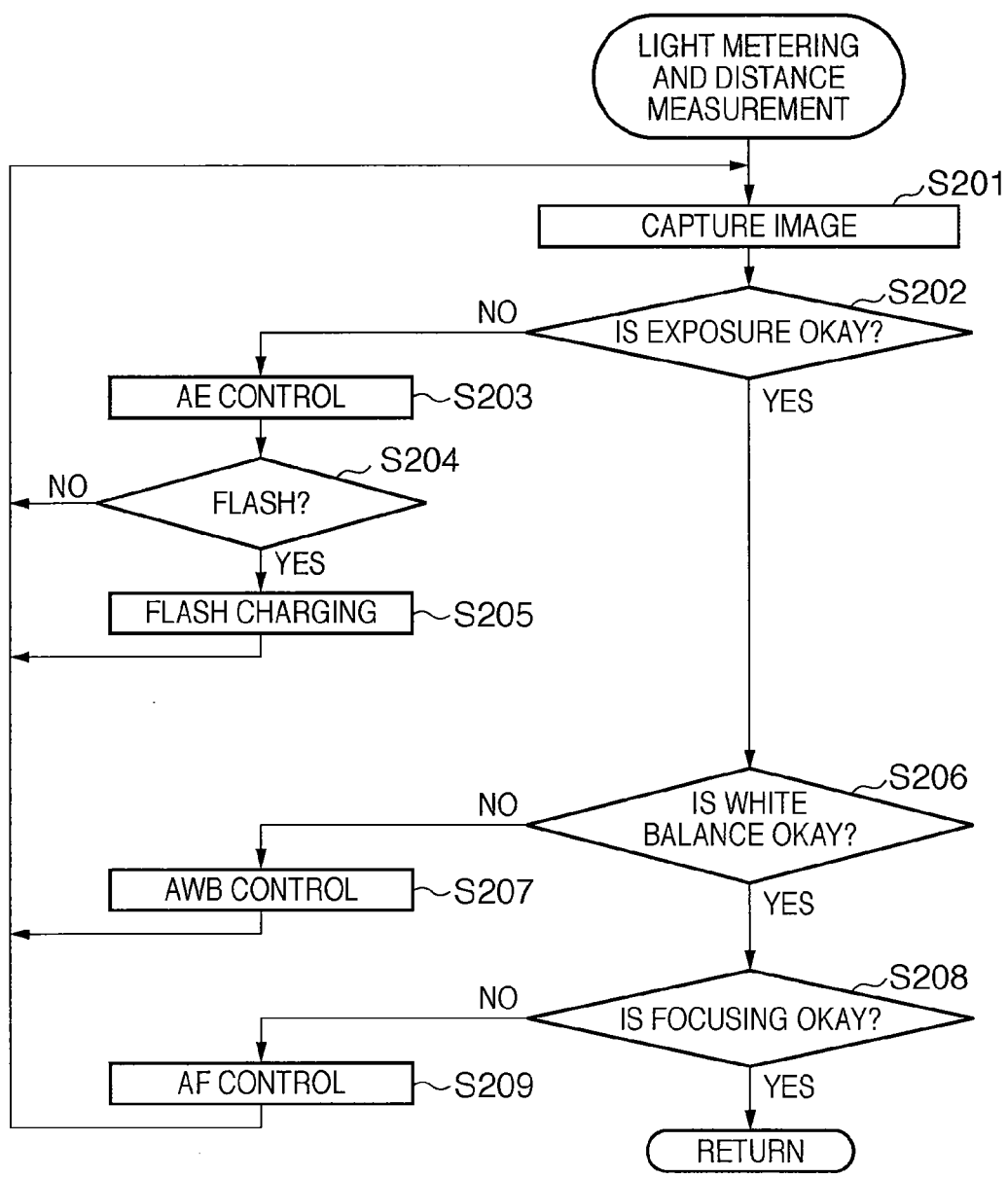
FIG. 4 is a flow chart of a light-metering and distance-measuring routine performed by an image recording apparatus according to an embodiment of the present invention.

FIG. 4 is a flow chart illustrating the details of the distance-measuring and light-metering processing performed in S116 in FIG. 2.

Referring to FIG. 4, in S201, the system control circuit 50 reads charge signals from the image-sensing element 14 and sequentially reads the read signals as image data into the image processing circuit 20 via the A/D converter 16. Using such sequentially captured image data, the image processing circuit 20 performs predetermined computations for use in processes such as a TTL (through-the-lens) AE (auto-exposure) process, an EF (flash pre-emission) process, and an AF (autofocus) process.

Note that, in the above-described processes, the necessary pixels are extracted from among all the captured pixels and the extracted pixels are used in computations. In the TTL AE, EF, AWB, and AF processes, it is possible to perform the most suitable computations for each mode, including a center-weighted mode, an average mode, and an evaluation mode.

In S202, the system control circuit 50 determines whether the exposure (AE) is adequate or not based on the computation result from the image processing circuit 20; if the exposure is inadequate, processing proceeds to S203, in which the exposure control unit 40 performs AE control.

In S204, the system control circuit 50 determines whether the firing of a flash is necessary or not, based on the measurement data obtained through AE control; if the firing of a flash is necessary, the flash flag is set in S205 in order to charge the flash device 400.

If the exposure is determined as being adequate in S202, the measurement data and/or set parameters are stored in the internal memory of the system control circuit 50 or in the memory 52.

In S206, the system control circuit 50 determines whether the balance (AWB) is adequate or not, using the computation result from the image processing circuit 20 and the measurement data obtained through AE control. If the balance is inadequate, the system control circuit 50 causes the image processing circuit 20 to perform AWE control so as to adjust parameters for use in color processing in S207.

If the white balance (AWB) is determined as being adequate in S206, the measurement data and/or set parameters are stored in the internal memory of the system control circuit 50 or in the memory 52.

In S208, the system control circuit 50 determines whether distance measurement (AF) has resulted in focusing or not, using the measurement data obtained through both AE and AWB control; if the distance measurement has not resulted in focusing, the system control circuit 50 causes the distance-measurement control unit 42 to perform AF control in S209.

If distance measurement (AF) has resulted in focusing in S208, the measurement data and/or set parameters are stored in the internal memory of the system control circuit 50 or in the memory 52, and the distance-measuring and light-metering processing routine (S116) is ended.

Figure 5:
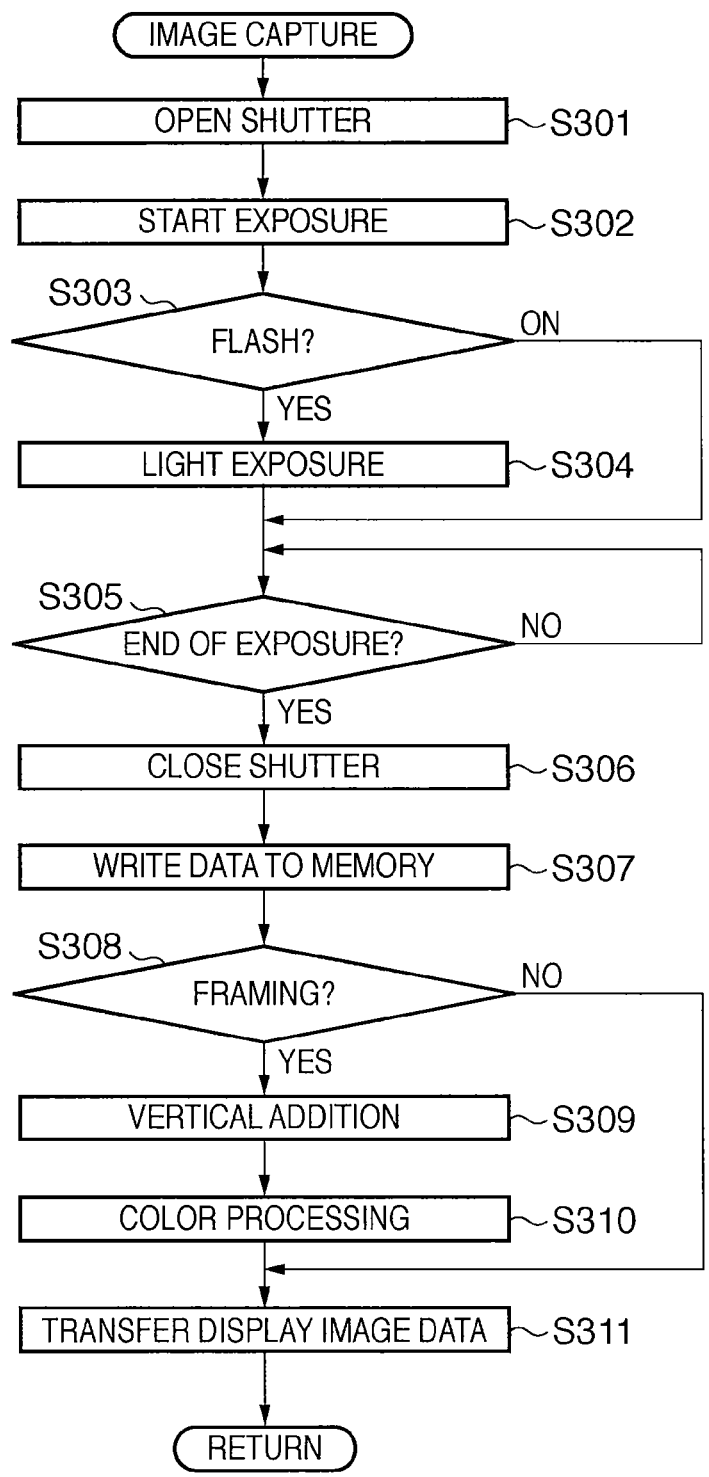
FIG. 5 is a flow chart of an image capture routine performed by an image recording apparatus according to an embodiment of the present invention.

FIG. 5 is a flow chart illustrating the details of the image capture process performed in S132 in FIG. 3.

Referring to FIG. 5, according to the light-metering data stored in the internal memory of the system control circuit 50 or in the memory 52, the system control circuit 50 causes the exposure control unit 40 to open the shutter 12 according to the aperture so that the image-sensing element 14 is exposed to light in S301 and S302.

In S303, the system control circuit 50 checks a flash flag to determine whether flash is necessary or not, and if necessary, a flash is fired in S304. Note that if flash is unnecessary, processing proceeds to S305.

In S305, the system control circuit 50 is left on standby until completion of the exposure of the image-sensing element 14 based on the light-metering data, and then in S306, causes the exposure control unit 40 to close the shutter 12 so as to finish exposure of the image-sensing element 14.

In S307, the system control circuit 50 reads charge signals from the image-sensing element 14. The read charge signals are then written as captured image data to a predetermined area of the memory 30 via the A/D converter 16, the image processing circuit 20, and the memory control circuit 22, or via the A/D converter 16 directly to the memory control circuit 22.

In S308, the system control circuit 50 determines whether framing is necessary or not according to the set image capture mode; if necessary, processing proceeds to S309; and if unnecessary, processing proceeds to S311.

In S309, the system control circuit 50 reads image data from the memory 30 and sequentially performs vertical addition processing (S309) and color processing (S310), using the memory control circuit 22, and if necessary, the image processing circuit 20. The processed image data is then written back into the memory 30.

In S311, the system control circuit 50 reads image data from the memory 30 and transfers the image data for display to the image display memory 24 via the memory control circuit 22.

After the completion of such a processing series, the image capture processing routine (S132) is ended.

Figure 6:
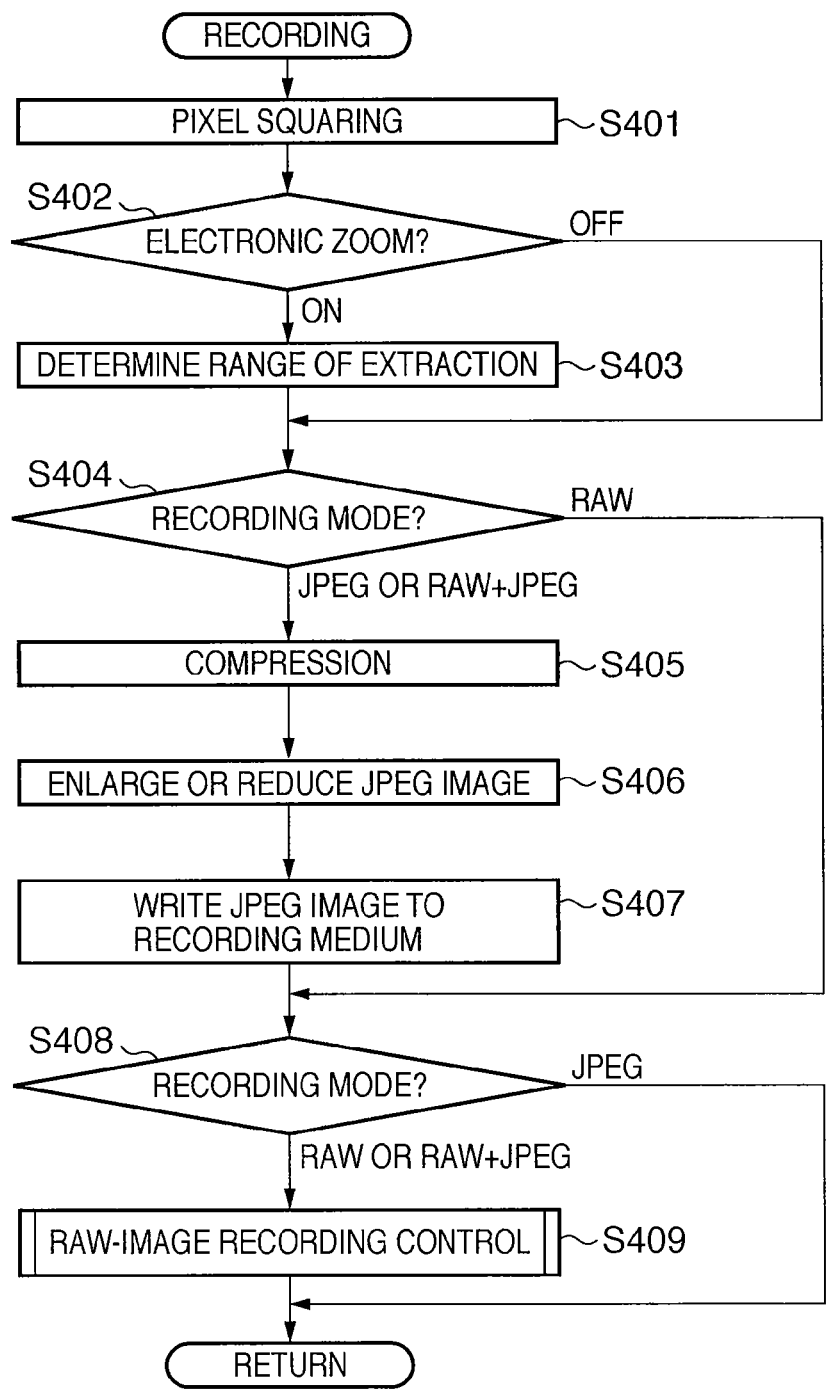
FIG. 6 is a flow chart of a recording routine performed by an image recording apparatus according to an embodiment of the present invention.

FIG. 6 is a flow chart illustrating the details of the recording process performed in S137 in FIG. 3.

Referring to FIG. 6, in S401, the system control circuit 50 performs a pixel squaring process in which captured image data is read from the memory 30 so as to set the ratio of vertical to horizontal pixels to 1:1 by interpolation, using the memory control circuit 22, and if necessary, the image processing circuit 20. The processed image data is then written back into the memory 30.

In S402, the system control circuit 50 confirms the electronic zoom settings; if the electronic zoom function is ON, processing proceeds to S403; and if the electronic zoom function is OFF, processing proceeds to S404.

In S403, the system control circuit 50 determines the range of extraction when using electronic zoom.

Figure 10:
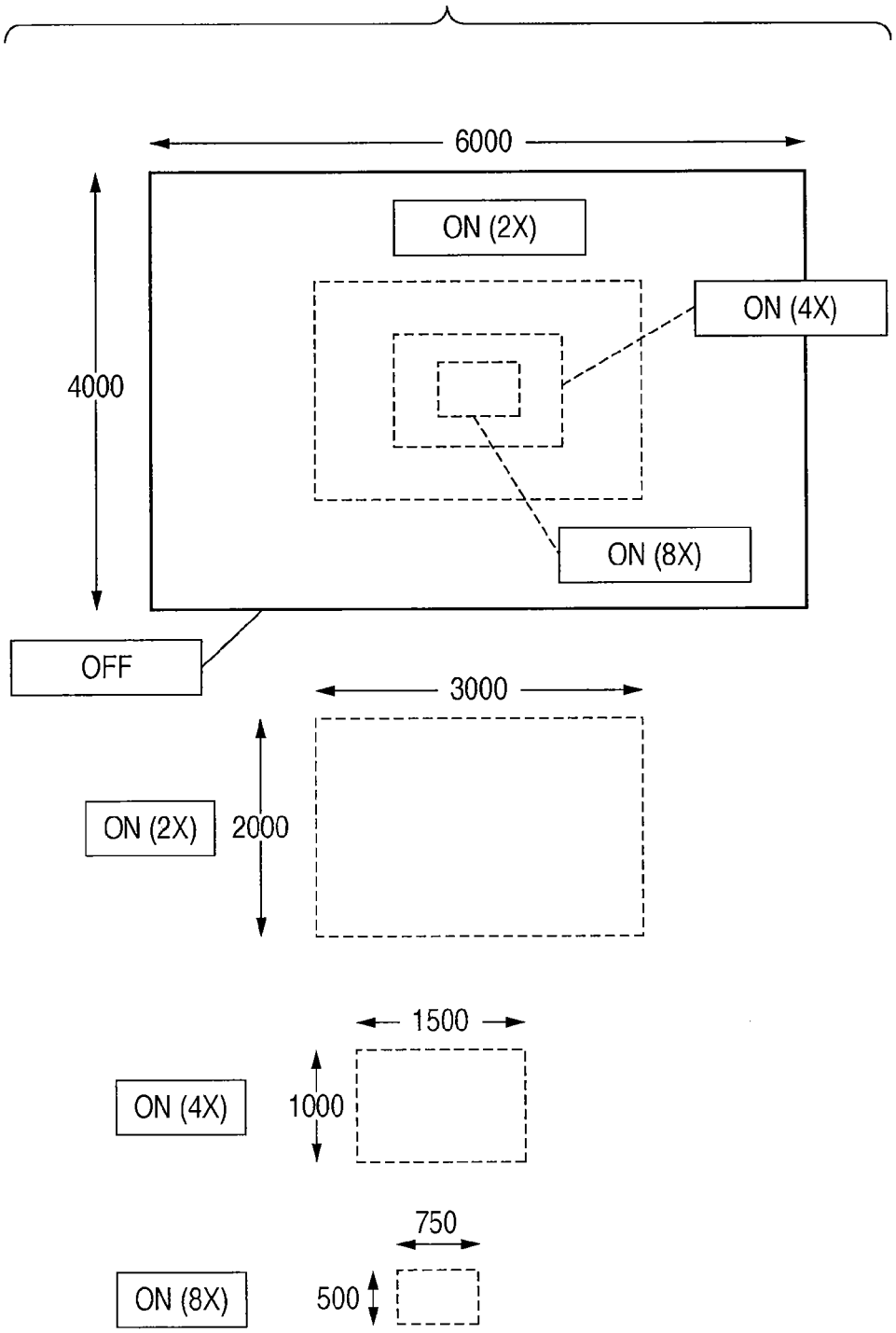
FIG. 10 is a diagram explaining the details of electronic zoom according to an embodiment of the present invention.

Specifically, as illustrated in FIG. 10, the range of extraction is determined by the set zoom magnification, according to which an electronic angle of view is changed.

In S404, the system control circuit 50 confirms the state of the set recording mode. If the recording mode is set to record RAW images (in non-compression format), processing proceeds to S408; and if the recording mode is set to record JPEG images (in compression format) or RAW images+JPEG images (in both non-compression and compression formats), processing proceeds to S405.

In S405, the system control circuit 50 causes the compression and decompression circuit 32 to perform image compression processing based on the content of the set JPEG-image recording size.

In S406, the system control circuit 50 performs enlargement and reduction processing according to the range of extraction determined in S403 and the set JPEG-image recording size. This processing is equivalent to the process for electronically changing the angle of view, that is, electronic zoom processing.

In S407, the system control circuit 50 writes the JPEG image to the recording medium 200 via the interface 90 and the connector 92.

In S408, the system control circuit 50 confirms the state of the set recording mode. If the recording mode is set to record JPEG images, processing is ended; and if the recording mode is set to record either RAW images or RAW images+JPEG images, processing proceeds to S409.

In S409, the system control circuit 50 performs RAW-image recording control. The details of the RAW-image recording control will be described later.

After the completion of such a processing series, the record processing routine (S138) is ended.

Figure 7:
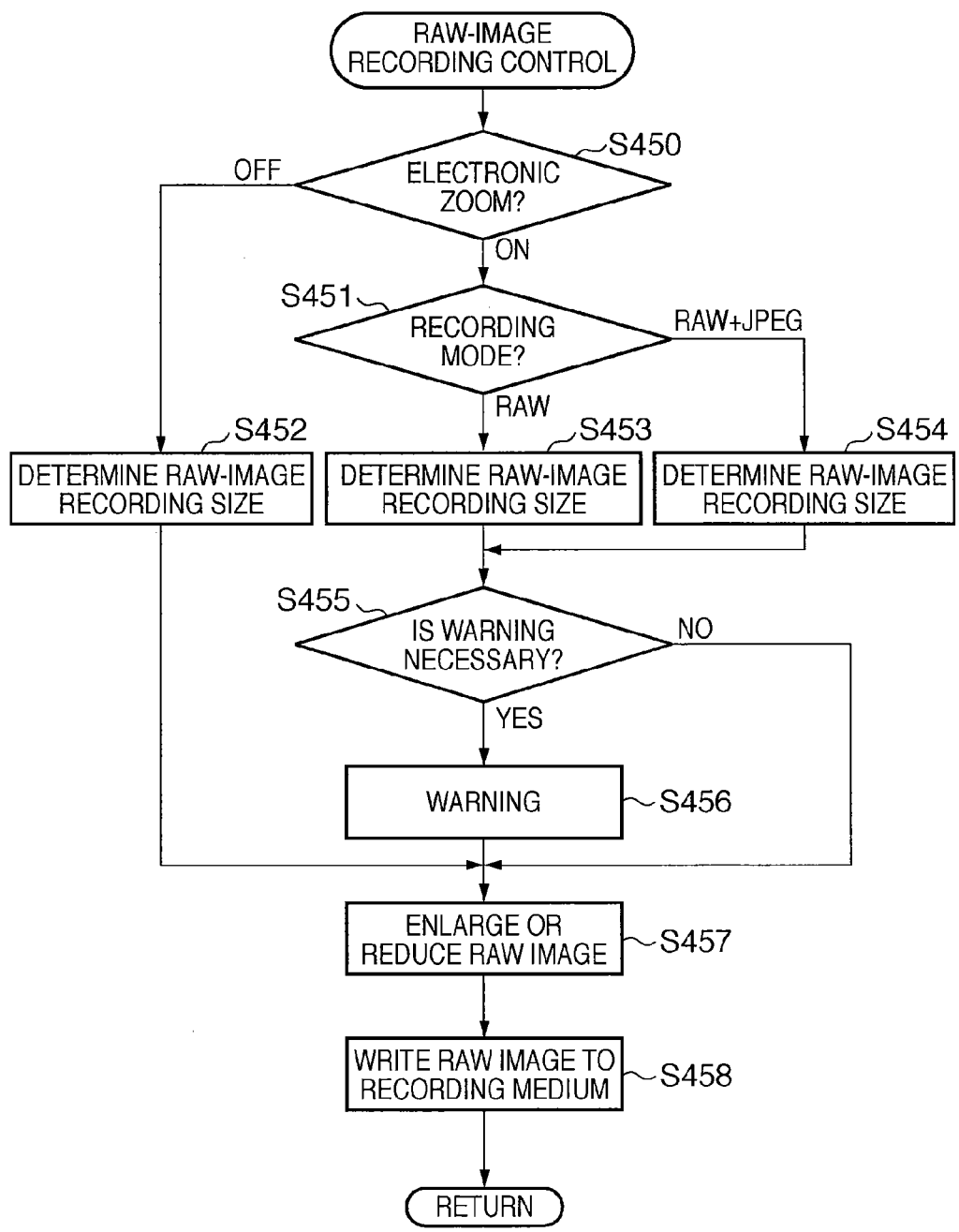
FIG. 7 is a flow chart of a RAW-image recording control routine according to an embodiment of the present invention.
Figure 9A:
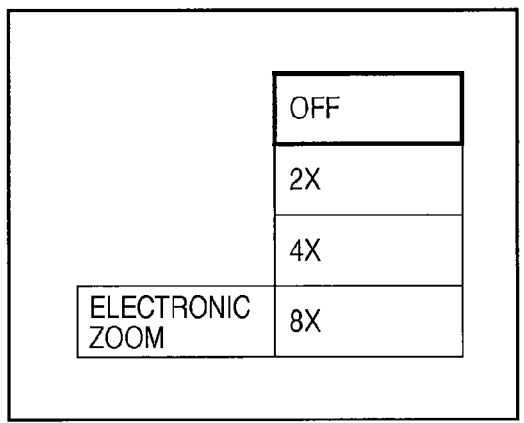
FIGS. 9A to 9D are diagrams explaining an electronic-zoom setting process according to an embodiment of the present invention.
Figure 9B:
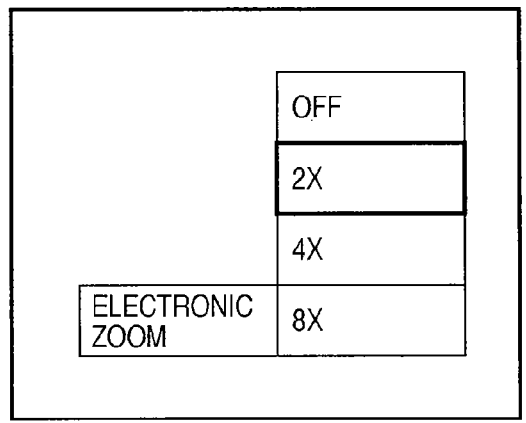
Figure 9C:
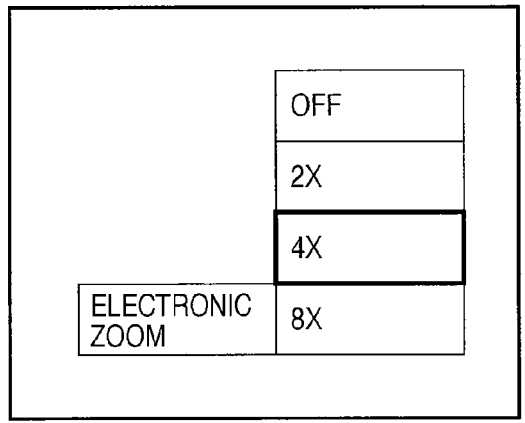
Figure 9D:
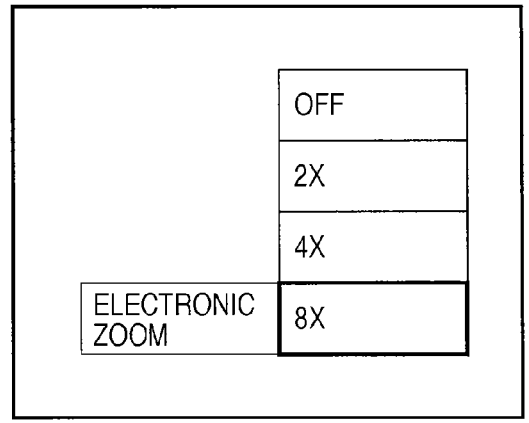

FIG. 7 is a flow chart illustrating the details of the RAW-image recording control performed in S409 in FIG. 6.

Referring to FIG. 7, in S450, the system control circuit 50 confirms the electronic zoom settings; if the electronic zoom function is OFF, processing proceeds to S452; and if the electronic zoom function is ON, processing proceeds to S451.

In S451, the system control circuit 50 confirms the state of the set recording mode; if the recording mode is set to record RAW images, processing proceeds to S453; and if the recording mode is set to record RAW images+JPEG images, processing proceeds to S454.

In S452, the system control circuit 50 determines the RAW-image recording size as follows: the set RAW-image recording size is determined as an actual RAW-image recording size.

In S453, the system control circuit 50 determines the RAW-image recording size as follows: a value that is one level higher than the set RAW-image recording size is determined as an actual RAW-image recording size.

For example, if the set RAW-image recording size is RAW, the actual recording size is determined as being RAW.

If the set RAW-image recording size is RAW-M1, the actual recording size is determined as being RAW.

If the set RAW-image recording size is RAW-M2, the actual recording size is determined as being RAW-M1.

If the set RAW-image recording size is RAW-S1, the actual recording size is determined as being RAW-M2.

If the set RAW-image recording size is RAW-S2, the actual recording size is determined as being RAW-S1.

In S454, the system control circuit 50 determines the RAW-image recording size as follows: a value that is equal to or higher than the set JPEG-image recording size is determined as an actual RAW-image recording size.

For example, if the set JPEG-image recording size is M1 and the set RAW-image recording size is RAW-M2, the actual RAW-image recording size is determined as being RAW-M1.

In S455, the system control circuit 50 determines whether a warning is necessary or not; if necessary, processing proceeds to S456; and if unnecessary, processing proceeds to S457.

In the present example, a warning is issued in the case where the zoom magnification is at its maximum value (8×) and the RAW-image recording size is at its minimum (S2), in which case it is presumed that degradation in image quality is obviously unavoidable.

In S456, the system control circuit 50 issues a warning (produces an electronic beeping sound) to notify the user of degradation in image quality. Note that a warning is not necessarily a sound, and the set RAW-image recording size may be displayed by flashing.

In S457, the system control circuit 50 performs enlargement and reduction processing, using the range of extraction determined in S403 and the RAW-image recording size determined in S452 to S454. The processing performed in S457 is equivalent to the process for electronically changing the angle of view, that is, electronic zoom processing.

In S458, the system control circuit 50 writes the RAW image to the recording medium 200 via the interface 90 and the connector 92, according to the RAW-image recording size determined as described above in S452 to S454.

After the completion of such a processing series, the RAW-image recording control processing routine (S409) is ended.

FIGS. 8A to 8D are diagrams explaining the menu processing performed in S106 in FIG. 2.

In the present embodiment, the processing is performed using the menu button, the set button, the menu shift + (plus) button, and the menu shift − (minus) button of the operation unit 70.

In the present embodiment, the menu items include four items, namely, recording mode, JPEG-image recording size, RAW-image recording size, and electronic zoom.

Every time the menu shift + (plus) button of the operation unit 70 is pressed, selection of the items rotates. More specifically, selection of the items rotates as follows: recording mode (FIG. 8A), JPEG-image recording size (FIG. 8B), RAW-image recording size (FIG. 8C), electronic zoom (FIG. 8D), recording mode (FIG. 8A), and so on.

Meanwhile, every time the menu shift − (minus) button of the operation unit 70 is pressed, selection of the items rotates. More specifically, selection of the items rotates as follows: electronic zoom (FIG. 8D), RAW-image recording size (FIG. 8C), JPEG-image recording size (FIG. 8B), recording mode (FIG. 8A), electronic zoom (FIG. 8D), and so on.

If the set button of the operation unit 70 is pressed while the desired item is selected, that item is confirmed.

The processing for each item will be described later with reference to FIG. 9A to FIG. 15.

If the menu button of the operation unit 70 is pressed, menu processing is ended.

FIGS. 9A to 9D are diagrams explaining one of the menu items, namely, an electronic-zoom setting process.

In the present embodiment, the process is performed, using the set button, the menu shift + (plus) button, and the menu shift − (minus) button of the operation unit 70 as electronic-zoom setting devices.

In the present embodiment, any one of the four options, namely OFF, 2×, 4×, and 8×, is selected as the content of the electronic zoom setting.

Every time the menu shift + (plus) button of the operation unit 70 is pressed, selection of the setting contents rotates as follows: OFF (FIG. 9A), 2× (FIG. 9B), 4× (FIG. 9C), 8× (FIG. 9D), OFF (FIG. 9A), and so on.

Also, every time the menu shift − (minus) button of the operation unit 70 is pressed, selection of the setting contents rotates as follows: 8× (FIG. 9D), 4× (FIG. 9C), 2× (FIG. 9B), OFF (FIG. 9A), 8× (FIG. 9D), and so on.

Then, if the set button of the operation unit 70 is pressed while the desired setting content is selected, that setting content is confirmed.

The electronic zoom function is now described with reference to FIG. 10.

If electronic zoom is set to OFF, the entire range, for example, 6000 horizontal pixels by 4000 vertical pixels, is extracted.

If electronic zoom is set to 2×, the range of 3000 horizontal pixels by 2000 vertical pixels is extracted.

If electronic zoom is set to 4×, the range of 1500 horizontal pixels by 1000 vertical pixels is extracted.

If electronic zoom is set to 8×, the range of 750 horizontal pixels by 500 vertical pixels is extracted.

Figure 11A:
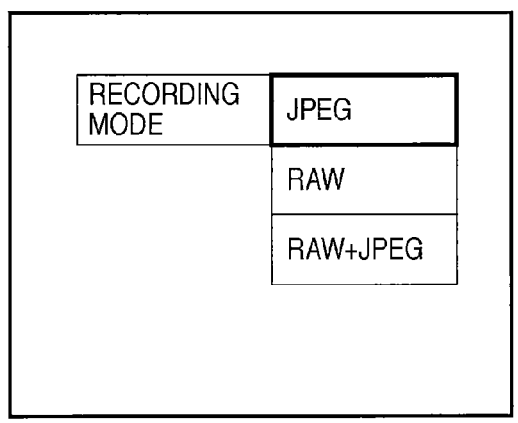
FIGS. 11A to 11C are diagrams explaining a recording-mode setting process according to an embodiment of the present invention.
Figure 11B:
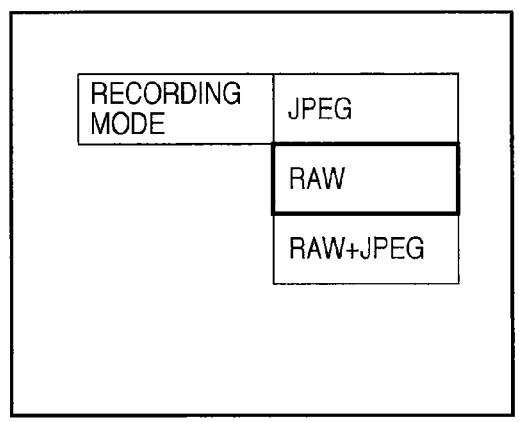
Figure 11C:
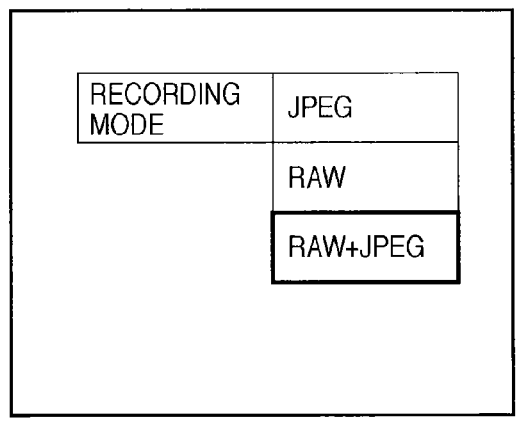
Figure 12A:
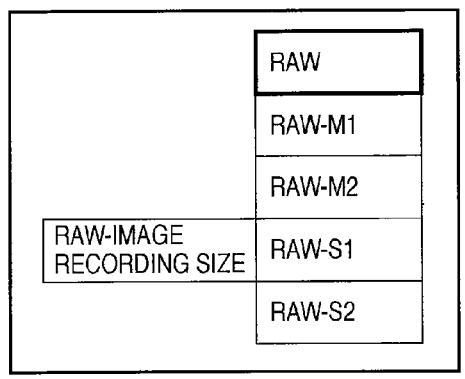
FIGS. 12A to 12E are diagrams explaining a RAW-image recording-size setting process according to an embodiment of the present invention.
Figure 12B:
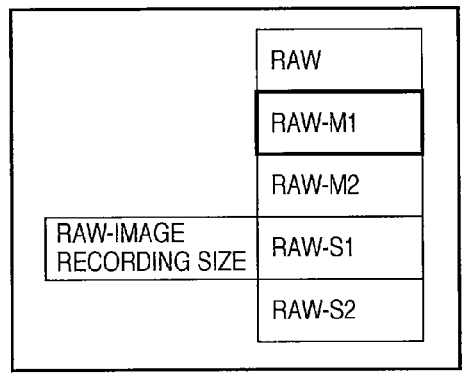
Figure 12C:
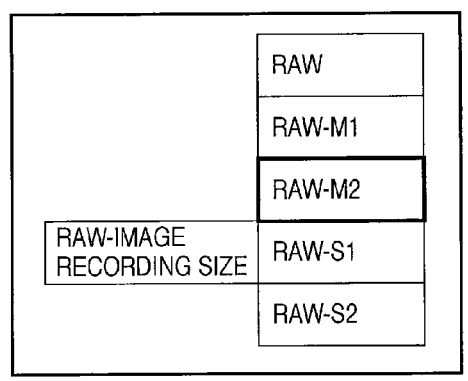
Figure 12D:
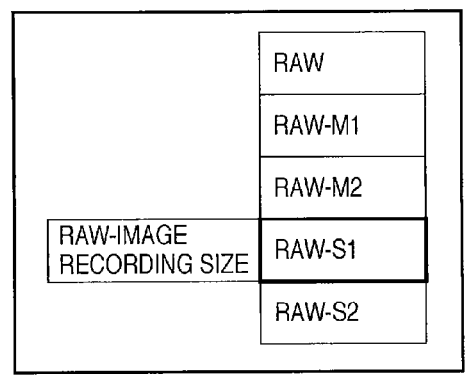
Figure 12E:
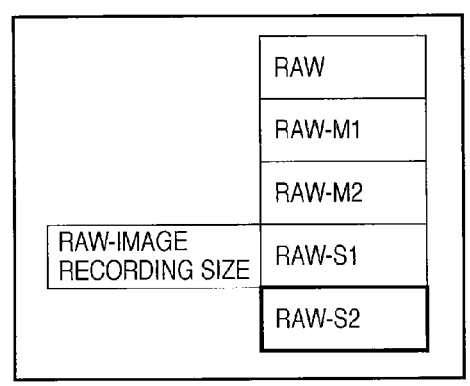

FIGS. 11A to 11C are diagrams explaining another one of the menu items, namely, a recording-mode selection process.

In the present embodiment, the process is performed, using the set button, the menu shift + (plus) button, and the menu shift − (minus) button of the operation unit 70 as recording-mode selecting devices.

In the present embodiment, any one of the three options, namely, JPEG image, RAW image, and RAW image+JPEG image, is selected as the content of recording-mode setting.

Every time the menu shift + (plus) button of the operation unit 70 is pressed, selection of the setting contents rotates as follows: JPEG image (FIG. 11A), RAW image (FIG. 11B), RAW image+JPEG image (FIG. 11C), JPEG image (FIG. 11A), and so on.

Meanwhile, every time the menu shift − (minus) button of the operation unit 70 is pressed, selection of the setting contents rotates as follows: RAW image+JPEG image (FIG. 11C), RAW image (FIG. 11B), JPEG image (FIG. 11A), RAW image+JPEG image (FIG. 11C), and so on.

If the set button of the operation unit 70 is pressed while the desired setting content is selected, that setting content is confirmed.

FIGS. 12A to 12E are diagrams explaining another one of the menu items, namely, a RAW-image-recording-size setting process.

In the present embodiment, the process is performed, using the set button, the menu shift + (plus) button, and the menu shift − (minus) button of the operation unit 70 as recording-size setting devices.

In the present embodiment, any one of the five options, namely RAW, RAW-M1, RAW-M2, RAW-S1, and RAW-S2, is selected as the setting content.

Every time the menu shift + (plus) button of the operation unit 70 is pressed, selection of the setting contents rotates. Specifically, selection of the setting contents rotates as follows: RAW (FIG. 12A), RAW-M1 (FIG. 12B), RAW-M2 (FIG. 12C), RAW-S1 (FIG. 12D), RAW-S2 (FIG. 12E), RAW (FIG. 12A), and so on.

Meanwhile, every time the menu shift − (minus) button of the operation unit 70 is pressed, selection of the setting contents rotates. Specifically, selection of the setting contents rotates as follows: RAW-S2 (FIG. 12E), RAW-S1 (FIG. 12D), RAW-M2 (FIG. 12C), RAW-M1 (FIG. 12B), RAW (FIG. 12A), RAW-S2 (FIG. 12E), and so on.

If the set button of the operation unit 70 is pressed while the desired setting content is selected, that setting content is confirmed.

The RAW-image recording size is now described with reference to FIG. 13.

The number of pixels recorded in RAW is approximately 24 megapixels, that is, 6000 horizontal pixels by 4000 vertical pixels.

The number of pixels recorded in RAW-M1 (RAW-Middle 1) is approximately 12 megapixels, that is, 4243 horizontal pixels by 2828 vertical pixels.

The number of pixels recorded in RAW-M2 (RAW-Middle 2) is approximately six megapixels, that is, 3000 horizontal pixels by 2000 vertical pixels.

The number of pixels recorded in RAW-S1 (RAW-Small 1) is approximately three megapixels, that is, 2121 horizontal pixels by 1414 vertical pixels.

The number of pixels recorded in RAW-S2 (RAW-Small 2) is approximately 1.5 megapixels, that is, 1500 horizontal pixels by 1000 vertical pixels.

FIGS. 14A to 14E are diagrams explaining another one of the menu items, namely, a JPEG-image-recording size setting process.

In the present embodiment, the process is performed, using the set button, the menu shift + (plus) button, and the menu shift − (minus) button of the operation unit 70 as recording-size setting devices.

In the present embodiment, one of the five options, namely L, M1, M2, S1, and S2, is selected as the setting content of the JPEG-image recording size.

Every time the menu shift + (plus) button of the operation unit 70 is pressed, selection of the setting contents rotates as follows: L (FIG. 14A), M1 (FIG. 14B), M2 (FIG. 14C), S1 (FIG. 14D), S2 (FIG. 14E), L (FIG. 14A), and so on.

Meanwhile, every time the menu shift − (minus) button of the operation unit 70 is pressed, selection of the setting contents rotates as follows: S2 (FIG. 14E), S1 (FIG. 14D), M2 (FIG. 14C), M1 (FIG. 14B), L (FIG. 14A), S2 (FIG. 14E), and so on.

Then, if the set button of the operation unit 70 is pressed while the desired setting content is selected, that setting content is confirmed.

The JPEG-image recording size is now described with reference to FIG. 15.

The number of pixels recorded in L (Large) is approximately 24 megapixels, that is, 6000 horizontal pixels by 4000 vertical pixels.

The number of pixels recorded in M1 (Middle 1) is approximately 12 megapixels, that is, 4243 horizontal pixels by 2828 vertical pixels.

The number of pixels recorded in M2 (Middle 2) is approximately six megapixels, that is, 3000 horizontal pixels by 2000 vertical pixels.

The number of pixels recorded in S1 (Small 1) is approximately three megapixels, that is, 2121 horizontal pixels by 1414 vertical pixels.

The number of pixels recorded in S2 (Small 2) is approximately 1.5 megapixels, that is, 1500 horizontal pixels by 1000 vertical pixels.

As described with reference to FIG. 6, the range of extraction when using electronic zoom is determined by the zoom magnification (S403).

In the case of recording a JPEG image, enlargement and reduction processing is performed according to the range of extraction when using electronic zoom and the set JPEG-image recording size (S406), and resultant data is recorded to the recording medium 200 (S407).

In the case of recording a RAW image, control is performed according to the recording mode, using a value that is different from the set RAW-image recording size:

If the recording mode is set to record RAW images, control is performed using a value that is one level higher than the set RAW-image recording size; and If the recording mode is set to record RAW images+JPEG images, control is performed using a value that is equal to or higher than the set JPEG recording size.

According to the above-described embodiment, in the case of enlarging a captured image with the electronic zoom function, it is possible to reduce degradation in the image quality of a JPEG image that is generated by developing the RAW image recorded at the time of image capture.

Second Embodiment

In the first embodiment, if the recording mode is set to record RAW images, degradation in image quality is reduced by performing control with a uniform value that is one level higher than the set RAW-image recording size.

Alternatively, it is also effective during control to previously compute how many levels the RAW-image recording size needs to be increased in order to reduce degradation in image quality, from the set zoom magnification (the number of extracted pixels) and the set RAW-image recording size. Similarly to the first embodiment, this processing is performed in S453 during the processing in FIG. 7.

For example, when the RAW-image recording size setting is RAW-S1, the electronic zoom magnification is set to 3× and image capture is performed. As shown in FIG. 13, since the recording density of RAW-M2 is 2× that of RAW-S1 and that of RAW-M1 is 4× that of RAW-S1, if the recording size is set to be more than one level higher than the current recording size, degradation in image quality can be reduced. In this embodiment, the actual recording size is desirably set to RAW-M1 or RAW.

Also, according to the first embodiment, the RAW image recording size is set to be the set JPEG-image recording size or higher when the recording mode is RAW image+JPEG image. In contrast to this, in view of both the set zoom magnification and JPEG-image recording size, it is effective to control the RAW-image recording size by calculating in advance the number of levels to increase the RAW-image recording size and whether or not degradation in image quality can be reduced. This process is performed in S454 during the processing of the flowchart in FIG. 7, similarly to the first embodiment.

For example, when the RAW-image recording size setting is RAW-S1, the electronic zoom magnification is set to 3× and image capture is performed. In this case, similarly to the case of the RAW-image recording mode described above, the RAW-image recording size calculated based on the electronic zoom magnification to be RAW-M1, which is two levels higher. In this case, in the present embodiment, the RAW-image recording size is set to be RAW-M1, which is a higher size, from among the calculated recording sizes. Also, if the JPEG-image recording size is set to L, the corresponding RAW-image recording size is RAW. In this case, the RAW-image recording size is set to RAW, which is a higher size, from among the calculated recording sizes.

According to the above-described embodiment, in the case of enlarging and capturing an image using the electronic zoom function, the RAW-image recoding size is determined based on the electronic zoom magnification and/or set JPEG-image recording size. As a result, it is possible to reduce degradation in image quality of a JPEG image that is generated by developing the RAW image recorded at the time of image capture.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-003997 filed Jan. 9, 2009 and No. 2009-291413 filed Dec. 22, 2009 which are hereby incorporated by reference herein in their entirety.

What is claimed is:

1. An image capturing apparatus for recording an image, comprising:
    an image capturing unit configured to capture an image;
    an electronic-zoom unit configured to perform the electronic zoom;
    a recording-size setting unit configured to set a recording size of a capturing image; and
    a control unit configured to control a recording size of a capturing image to be larger than the recording size set by the recording-size setting unit in a case that the electronic-zoom unit performs the electronic zoom such that an image is enlarged.

2. The apparatus according to claim 1, wherein said control unit controls the recording size of the capturing image in a non-compression format to be larger than the recording size set by the recording-size setting unit.

3. The apparatus according to claim 1, further comprising:
    a recording-mode selection unit configured to select at least either a non-compression format or a compression format as a recording mode in recording the captured image; and
    wherein the recording-size setting unit configured to set a recording size in each recording mode.

4. The apparatus according to claim 3, wherein in a case that the electronic-zoom unit performs the electronic zoom such that an image is enlarged and the recording mode is selected as the compression format, the recording size in the non-compression format is equal or larger than the recording size in the compression format set by the recording-size setting unit.

5. The apparatus according to claim 3, wherein said control unit calculates the recording size in the non-compression format based on a zoom magnification of the electronic zoom by the electronic-zoom unit and controls the recording size in the non-compression format to be the calculated recording size.

6. The apparatus according to claim 3, wherein said control unit calculates the recording size in the non-compression format based on the zoom magnification of the electronic zoom by the electronic-zoom unit and controls the recording size in the non-compression format to be the larger one from the calculated recording size and the recording size in the compression format set by the recording-size setting unit.

7. The apparatus according to claim 3, wherein the recording-mode selection unit is capable of selecting either one or both of the non-compression format and the compression format as the recording mode.

8. The apparatus according to claim 1, further comprising:
a determination unit configured to determine whether or not image quality will be reduced when recording the captured image from the zoom magnification of the electronic zoom by the electronic-zoom unit and the recording size set by the recording-size setting unit; and
a warning unit configured to issue a warning when the determination unit has determined that image quality will be reduced.

9. A method for controlling an image capturing apparatus that records an image captured by use of electronic zoom, comprising:
performing the electronic zoom;
setting a recording size of a capturing image; and
controlling a recording size of a capturing image to be larger than the set recording size in a case that the electronic zoom is performed such that an image is enlarged.

10. An image processing apparatus for recording an image obtained by use of electronic zoom, comprising:
an electronic-zoom setting unit configured to set a zoom magnification of the electronic zoom;
a recording-size setting unit configured to set a recording size of an image; and
a control unit configured to control a recording size of an image to be larger than the recording size set by the recording-size setting unit in a case that the zoom magnification is set to a magnification at which an image is enlarged.

11. The apparatus according to claim 10, wherein said control unit controls the recording size of the image in a non-compression format to be larger than the recording size set by the recording-size setting unit.

12. The apparatus according to claim 10, further comprising:
a recording-mode selection unit configured to select at least either a non-compression format or a compression format as a recording mode in recording the captured image; and
wherein the recording-size setting unit configured to set a recording size of an image in each recording mode.

13. The apparatus according to claim 12, wherein, under control of the control unit, in a case that the zoom magnification is set to a magnification at which an image is enlarged and the recording mode is selected as the compression format, the recording size in the non-compression format is equal or larger than the recording size in the compression format set by the recording-size setting unit.

14. The apparatus according to claim 12, wherein said control unit calculates the recording size in the non-compression format based on the zoom magnification and controls the recording size in the non-compression format to be the calculated recording size.

15. The apparatus according to claim 12, wherein said control unit calculates the recording size in the non-compression format based on the zoom magnification and controls the recording size in the non-compression format to be the larger one from the calculated recording size and the recording size in the compression format set by the recording-size setting unit.

16. The apparatus according to claim 12, further comprising:
a determination unit configured to determine whether or not image quality will be reduced when recording the captured image from the zoom magnification set by the electronic-zoom setting unit and the recording size set by the recording-size setting unit; and
a warning unit configured to issue a warning when the determination unit has determined that image quality will be reduced.

17. The apparatus according to claim 12, wherein said recording-mode selection unit is capable of selecting either one or both of the non-compression format and the compression format as the recording mode.

18. A method for controlling an image processing apparatus that records an image obtained by use of electronic zoom, comprising:
an electronic-zoom setting step of setting a zoom magnification of the electronic zoom;
setting a recording size of an image; and
controlling a recording size of an image to be larger than the recording size set by the recording-size setting step in a case that the zoom magnification is set to a magnification at which an image is enlarged.

19. An image processing apparatus for recording an image, comprising:
a recording-size setting unit configured to set recording sizes of an image in a non-compression format and a compression format; and
a control unit configured to control the recording size of an image in the non-compression format to be larger than the recording size of an image in the compression format set by the recording-size setting unit in a case that the recording size of an image in the non-compression format set by the recording-size setting unit is smaller than the recording size of an image in the compression format set by the recording-size setting unit.

20. A method for controlling an image processing apparatus that records an image, comprising:
setting recording sizes of an image in a non-compression format and a compression format; and
controlling the recording size of an image in the non-compression format to be larger than the set recording size of an image in the compression format in a case that the set recording size of an image in the non-compression format is smaller than the set recording size of an image in the compression format.

* * * * *